United States Patent [19]

Dowds

[11] Patent Number: 4,635,540
[45] Date of Patent: Jan. 13, 1987

[54] BAKER'S DOUGH PROOFING AND RAISING UNIT

[75] Inventor: Henry M. Dowds, Woodside, N.Y.

[73] Assignee: Traulsen & Co., Inc., College Point, N.Y.

[21] Appl. No.: 381,700

[22] Filed: May 25, 1982

[51] Int. Cl.$^4$ .............................................. A21C 13/00
[52] U.S. Cl. ........................................ 99/468; 99/467; 99/483; 137/132
[58] Field of Search .......... 99/467, 468, 469, 473–476, 99/477–479, 483, 486, 487, 493, 516; 219/401, 333, 362, 273; 134/56 R, 57 R, 62, 113; 126/369, 369.1; 34/348, 20, 151; 137/123, 132, 134, 247.11; 4/368, 374, 421, 425; 426/418, 419, 124

[56] References Cited
U.S. PATENT DOCUMENTS 1,456,196  5/1923  Staats .
3,082,433  3/1963  Armstrong et al. .
3,621,495  11/1971  Carson .
3,908,204  9/1975  Hopkins .
3,965,492  6/1976  Hendricks .
4,291,836  9/1981  Chen-Hsiung .................. 137/132 X
4,373,430  2/1983  Allen ................................ 99/474 X Primary Examiner—Timothy F. Simone
Attorney, Agent, or Firm—S. C. Yuter

[57] ABSTRACT

A baker's dough proofing and raising unit includes a vessel having a vacuum siphon and water-addition mechanism for respectively extracting residual water and adding new water. A temperature and humidity adjusting cabinet is connected by flow conduits to and from the air space above the dough being proofed. A manual setting mechanism sets the desired temperature and humidity of the circulating water vapor. Audible and visual alarm mechanisms alert operators to predetermined variations of the temperature and humidity of the circulating water vapor. A preset timer controls the cleaning of the vessel by siphoning water from it and refilling it.

7 Claims, 1 Drawing Figure

BAKER'S DOUGH PROOFING AND RAISING UNIT

BACKGROUND OF THE INVENTION

1. Field of the Invention

This invention relates to a baker's dough proofing and raising unit and, more particularly, to a unit including vessel cleaning means.

2. Description of the Related Art

Baker's dough proofing and raising units typically include a portion adapted to contain a mixture of dough and water vapor, with water vapor conditioning means in a separate portion of the unit for controlling the temperature and humidity of the water vapor transmitted to the dough portion of the unit. These dough proofing and raising units also include vessels, such as humidifiers, which have to be cleaned periodically.

The vessel cleaning means of the invention utilizes solenoid-controlled water-flow valves and a timer mechanism. Known prior art patents include the commode or urinal flush-tank valve system of Hopkins U.S. Pat. No. 3,908,204, Staats U.S. Pat. No. 1,456,196 to a push-button solenoid-valve commode flush tank system, the solenoid-valve controlled flush tank of Carson U.S. Pat. No. 3,621,495 and the solenoid-switch system of the commode of Hendricks U.S. Pat. No. 3,965,492 and Armstrong U.S. Pat. No. 3,082,433.

BRIEF SUMMARY OF THE INVENTION

An object of the invention is to provide an improved means for cleaning a vessel in a dough proofing and raising unit.

Another object of the invention is to provide a vessel cleaning means which may be conveniently and automatically operated during a baker's schedule of non-use of the dough proofing and raising unit.

A further object of the invention is to provide automatic control of both the temperature and humidity of an air blanket over the dough being proofed.

Still another object of the invention is to provide indicating means for alerting operating personnel of variations in the temperature and humidity of the air blanket when such variations exceed predetermined preset levels.

Briefly, in accordance with the preferred embodiment of the invention, a baker's dough proofing and raising unit is provided comprising a portion adapted to contain a mixture of dough and water vapor. Water vapor conditioning means in a separate portion of the unit controls the temperature and humidity of the water vapor transmitted to the dough-containing portion. Vessel means in one portion of the unit supports the dough-proofing process. Coupled to the vessel means is solenoid-operated water addition means for adding water to the vessel means. Also coupled to the vessel means is solenoid-operated vacuum-jet siphon means for extracting water from the vessel means. After a dough-proofing process is completed, timer means causes the cleaning of the vessel means by first activating the siphon means until the water contents of the vessel means are withdrawn, and then activating the water addition means until water has been added to the vessel means to a predetermined level.

A feature of the invention is manual switching means for manually causing the cleaning of the vessel means.

Other objects and features will be apparent from the following description of the invention set-forth herein, as typically illustrated in the drawings which are for purposes of improved understanding, but are not intended to limit the invention to the mere illustrated embodiments, the invention including variations within ordinary skill of the art.

Broadly the invention may be described as a baker's unit, or system, having to do with a baker's dough proofing and raising vessel and accompanying accessories that cumulatively, in other words in combination, result in much improved and predictable and consistent baking results for the baker. In particular, there is a conventional liquid-retainable dough proofing and raising vessel having closed bottom and sides with a normally open top, receivable optionally however of a lid for closing its upper opening substantially. For use as a part of the combination, there is an extraction unit such as preferably an extraction tube having in flow series a vacuum-jet aspirator such that residual and/or washwater placed in the liquid-holding space of the vessel may be quickly and forceably withdrawn whereby a cleansing of the vessel is possible efficiently such that scales and deposits from water-minerals and dough residuals are thoroughly removed from the vessel. As a result of this cleansing unit and operation now possible with little effort on the part of the baker operator(s), inconsistencies in results of baking during subsequent uses of the vessel result. As a part of the combination, there is a liquid or water-addition mechanism for adding desired or appropriate amounts of water to the vessel, and there is a timer mechanism automatically controllable and regulatable of the liquid-extraction unit and water-addition mechanism. Preferably the timer mechanism includes mechanism for setting for actuation at particular specific time(s) as might be desired around the clock, for actuation or initiation of the cycles and/or separate withdrawal (extraction) of vessel residual liquid and/or addition or refilling water into the vessel. Upon withdrawing the water or residual water solution or suspension of dust and/or flakes and/or mineral deposits, it is led-off to an appropriate drain or the like, exterior to the vessel. Preferably, the aspirator above-noted for vacuum-withdrawal of the vessel liquid, includes a siphoning extraction tube inserted through an upper opening in the baker's proofing and raising vessel above-noted for dough, noting that there are many operations carried on in this vessel and also noting that this arrangement is the more efficient and practical approach for such a vessel, including ease of maintaining cleanliness of vessel interior and of the liquid-extraction not readily nor effectively possible if by way of an attachment to a hole in a lower portion of the vessel. Also, as noted-above, the cleaning function of this insertion from above and siphoning arrangement appears to be enhanced by this arrangement, as well as the avoiding of potential leaks from lower attachments and potential gathering of crud by permanent lower-vessel attachments.

Preferably the addition and withdrawal mechanisms are by way of water-flow valves—one for turning off and on alternately the water flow in a water-addition conduit from a source of water, and the other water-flow control valve being ahead of and the source of water to the vacuum-jet aspirator, for turning on and off.

Preferably each of these above-noted water-flow valves are designed for control by and in combination with solenoids connected to and controlled by the timer mechanism and the setting elements thereof.

Preferably there is additionally in combination with the baker's proofing and raising vessel, structure and mechanisms for detecting temperature of the layer(s) of air, or air blanket—or generally gas blanket, in contact with an upper surface of dough and/or water or other liquid or liquid solution or suspension in the vessel, and for adjusting that temperature to a desired level.

Preferably also there is additionally in combination with the baker's proofing and raising vessel, structure and mechanisms for detecting humidity of the layer(s) or blanket above-noted within the vessel space, and for adjusting that humidity to a desired level.

In a further preferred embodiment, there is provided a cabinet structure having enclosed space into which air or other gas from the above-noted air or gas-blanket is pumped into the cabinet enclosed space where if needed, the temperature thereof and/or humidity thereof is changed to desired levels. Preferably heating elements typically electrical heating elements are turned-on and off in response to a thermostat located at either the location of the gas or air-blanket or within the cabinet itself. Gas or air from the blanket within the vessel space is pumped by a pump to the cabinet enclosed-space by an intake conduit, and from the vessel to the vessel space by an output conduit. Also preferably included are pre-setting mechanisms for presetting and/or adjusting the desired level(s) respectively, of the temperature and humidity of the blanket of gas or air circulated from and to the vessel space.

Preferably also there are included one or more audible and/or visual alerting-alarms connected to work cooperatively and functionally with the thermostat and/or other thermometer and with the detector of humidity, in measuring temperature and/or humidity of the gas or air blanket above-noted, such that when predetermined plus or minus variation(s) occur in either or both temperature and/or humidity of the gas or air blanket, the attention of the baker operator is alerted by the audible and/or visual alarm(s) such as bell(s) and/or light(s) or the like.

The invention may be better understood by making reference to the following Figures.

THE FIGURE

The FIGURE showing most elements in perspective top-side view is purely diagrammatic in its representations of the entire inventive combination above-described as the novel baker's dough proofing and raising unit, showing the vessel, conduits, valves, solenoids, circuitry, timer, control panels, thermostats, heating elements, humidifier, and the like, some shown in partial cut-away.

DETAILED DESCRIPTION

Figure 1:
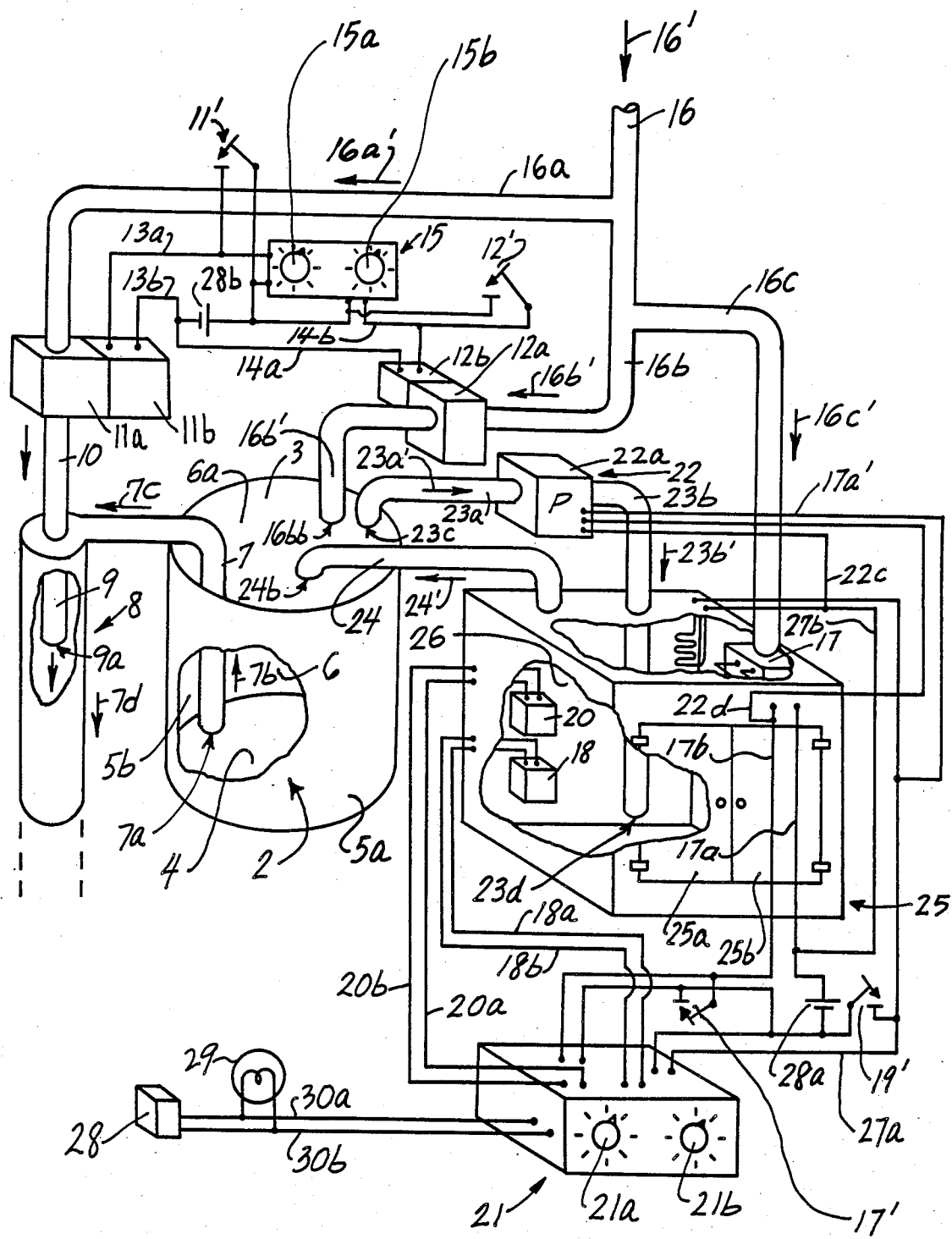

In greater detail, the FIGURE illustrates the preferred embodiments above-described, as follows. The baker's dough proofing and raising vessel 2 has an upper opening 3, bottom 4, outside side wall 5a, inside side wall 5b, liquid and/or dough-containing space 6, upper vessel space 6a in the vicinity at which the gas or air-blank wound be normally principally located, vacuum-jet siphon intake conduit 7 having a lower opening 7a, intake conduit 24, cabinet 25 having cabinet doors 25a and 25b, output conduits 23b and 23a, pump 22, water-refill conduit 16b' having outlet 16bb, conduit outlet 23c, intake conduit intake port 24a, output conduit intake port 23d, intake cionduit outlet 23d, heating-electrical elements 19, humidifier 17, thermostat temperature-detector 20, humidity detector 18, control box 21, temperature-setting knob 21a, humidity-setting knob 21b, siphon time-setting knob 15a and refill time-setting knob 15b of timer 15, manual actuation siphoning switch 11', manual actuation refill switch 12', manual heating elements actuation switch 19', manual humidifier actuation switch 17', vacuum-jet unit 8, jet-nozzle 9 and jet-nozzle outlet spout 9a, jet-nozzle conduit 10, jet-nozzle actuation valve 11a and its solenoid 11b, refill valve 12a and its solenoid 12b, solenoid circuits 13a and 13b, refill solenoid circuits 14a and 14b, water supply conduits 16a, 16b, and 16c, refill conduit outlet 16bb, humidifier circuits 17a, and 17b and its pump-actuation circuit 22d, heater element circuits 27a and 27b and the pump-actuation circuit 17a' thereof, thermostat sensing circuits 20a and 20b, pump third-wire circuit 22c, pump manual actuation switch 22a, cabinet space 26 for enclosed-air (or other gas such as nitrogen) treatment, water-flow directions 16', 16a', 16b', and 16c', and gas or air-flow directions 23a' and 23b' and 24', and intake conduit outlet port 24b, and siphoned water or liquid directions of flow, directions 7b, 7c, and 7d, and humidity sensing circuits 18a and 18b, and batteries 28a and 28b as typical direct current sources—which of course could use equivalent rectifier and step-down electrical circuits from an alternating current supply.

By employing the baker's dough proofing and raising unit of this invention, it is possible for the baker to proof the dough at a given and reproducable temperature and humidity which will result in a more consistent and better product. As noted above, a forced air circulating system is used to completely distribute conditioned air (temperature and humidity having been adjusted) conditioned within the cabinet 25. If and when the detected air transmitted from the vessel space 6 to the cabinet space 26 is too high or too low, or the humidity thereof too high or too low, relative to the point-pre-set by the knobs 21a and 21b, respectively, the alarm(s) 28—audible, and/or light alarm 29 will become actuated through the circuit leads 30a and 30b—the range of permitted variation being a normally built-in feature within ordinary skill in the construction of the control box. The point of alarm will depend upon the presetting of the temperature-setting knob 21a and the humidity-setting knobe 21b. Typically, the thermostat temperature knob should be set for a temperature of 105 degrees Fahrenheit, and the humidity knob typically should be set for 80% rh.. There are times that an alarm may merely reflect a time-lag, between the detection, adjusting of the cabinet-air, and returning that conditioned air to the vessel as an air blanket.

In normal operating procedures, after the baker is through with the vessel for the day, typically the vessel may be either automatically filled by the pre-set time by knob 15b set for example for the same time every day, or manually by the switch 12', and with the liquid already in the vessel and/or so-added, a desired soaking-time may be permitted if so-desired, and at the pre-set time as set by the knob 15a, the solution or suspension of soiled water may be siphoned from the vessel, followed by refilling the vessel to the desired level—again either automatically or manually. Typically, automatically the vessel will have the residual water or water solution or suspension withdrawn—followed by immediate refilling preparatory for the baker's next use. These operations are normally carried on preferably automatically before the baker is ready to again use the unit, so that thus automatically all of this cleaning and refilling has been taken care of without delay his baking activities; and by this procedure, the baking procedures of proofing and raising are blessed by the benefits above-noted, in his resulting products/goods. For different doughs and for different units, there will be some variations in performance, requiring experimentation by the baker, to ascertain best or optimum temperatures and humidities.

It is within the scope of the invention to make such variations and modifications as within ordinary skill of the artisan in this trade.

I claim:

1. A baker's dough proofing and raising unit comprising:
   (a) dough-proofing apparatus having a portion adapted to contain a mixture of dough and water vapor;
   (b) water vapor conditioning means included in a separate portion of said dough-proofing apparatus for controlling the temperature and humidity of water vapor;
   (c) water vapor transmission means for transmitting water vapor between said portions of said dough-proofing apparatus;
   (d) said water vapor conditioning means comprising water vapor temperature control means responsive to the temperature of water vapor for controlling the heating of water vapor by said water vapor conditioning means to maintain the temperature of water vapor at a predetermined operating temperature for dough proofing;
   (e) said water vapor conditioning means further comprising water vapor humidity control means responsive to the humidity of water vapor for controlling the humidity of water vapor to maintain the humidity of water vapor at a predetermined operating humidity for dough-proofing;
   (f) vessel means comprising one portion of said dough-proofing apparatus for supporting the dough-proofing process;
   (g) solenoid-operated water addition means coupled to said vessel means for adding water to said vessel means;
   (h) solenoid-operated vacuum-jet siphon means coupled to said vessel means as the sole means for extracting water from said vessel means; and
   (i) timer means for causing the cleaning of said vessel means after a dough-proofing process is completed by activating said solenoid-operated vacuum-jet siphon means until the water contents of said vessel means are withdrawn from said vessel means, and thereafter activating said solenoid-operated water addition means until water has been added to said vessel means to a predetermined level.

2. A baker's dough proofing and raising unit according to claim 1 further comprising indicating means responsive to said water vapor temperature control means and said water vapor humidity control means for indicating when the temperature or humidity of water vapor in said dough-proofing apparatus varies from a predetermined operating temperature or a predetermined operating humidity.

3. A baker's dough proofing and raising unit according to claim 2 wherein said timer means automatically causes said vessel means to be cleaned at a predetermined time.

4. A baker's dough proofing and raising unit according to claim 3 further comprising manual switching means for operating said solenoid-operated water addition means and vacuum-jet siphon means for manually causing the cleaning of said vessel means.

5. A baker's dough proofing and raising unit according to claim 4 wherein said water vapor temperature control means comprises temperature sensing means for sensing the temperature of water vapor and water vapor heating means for heating water vapor to maintain its temperature at said predetermined operating temperature.

6. A baker's dough proofing and raising unit according to claim 4 wherein said water vapor humidity control means comprises humidity sensing means for sensing the humidity of water vapor and humidifier means for increasing the humidity of water vapor to maintain its humidity at said predetermined operating humidity.

7. A baker's dough proofing and raising unit according to claim 6 wherein said water vapor conditioning means further comprises temperature setting means and humidity setting means to set said predetermined operating temperature and operating humidity.

* * * * *